US011605330B1

(12) United States Patent
Choi et al.

(10) Patent No.: US 11,605,330 B1
(45) Date of Patent: Mar. 14, 2023

(54) MITIGATION OF TEARING FROM INTRA-FRAME PAUSE

(71) Applicant: Apple Inc., Cupertino, CA (US)

(72) Inventors: Myungjoon Choi, San Jose, CA (US);
Jie Won Ryu, Santa Clara, CA (US);
Hyunwoo Nho, Palo Alto, CA (US);
Xiaokai Li, Mountain View, CA (US);
Kaikai Guo, San Francisco, CA (US);
Szu-Hsien Lee, Los Gatos, CA (US);
Rungrot Kitsomboonloha, San Jose, CA (US); Pei-En Chang, San Jose, CA (US); Amit Nayyar, Saratoga, CA (US); Vehbi Calayir, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/853,649

(22) Filed: Jun. 29, 2022

Related U.S. Application Data

(60) Provisional application No. 63/242,952, filed on Sep. 10, 2021.

(51) Int. Cl.
*G09G 3/20* (2006.01)
*G06F 3/041* (2006.01)

(52) U.S. Cl.
CPC ............. *G09G 3/20* (2013.01); *G06F 3/0418* (2013.01); *G09G 2320/0233* (2013.01); *G09G 2320/0266* (2013.01)

(58) Field of Classification Search
CPC ............. G09G 3/20; G09G 2320/0233; G09G 2320/0266; G06F 3/0418
See application file for complete search history.

(56) References Cited

U.S. PATENT DOCUMENTS

| | | | |
|---|---|---|---|
| 9,727,185 B2 | 8/2017 | Wang et al. | |
| 10,261,632 B2 | 4/2019 | Holland et al. | |
| 2016/0259478 A1 | 9/2016 | Wang et al. | |
| 2017/0115779 A1 | 4/2017 | Shepelev et al. | |
| 2018/0081491 A1 | 3/2018 | Holland et al. | |
| 2019/0392742 A1* | 12/2019 | Muraki | G09G 3/006 |
| 2019/0392780 A1* | 12/2019 | Hoover | G09G 3/20 |
| 2019/0392783 A1* | 12/2019 | Yang | G09G 5/14 |
| 2019/0393291 A1* | 12/2019 | Jeon | H01L 27/3272 |
| 2021/0350763 A1 | 11/2021 | Okamura et al. | |

* cited by examiner

*Primary Examiner* — Sejoon Ahn
(74) *Attorney, Agent, or Firm* — Fletcher Yoder, P.C.

(57) ABSTRACT

Embodiments presented herein relate to reducing visual artifacts on an electronic display caused by an intra-frame pause. To do so, the intra-frame pause may be divided into smaller intra-frame pause segments. The intra-frame pause segments may be applied to the display during different image frames and/or at different locations on the electronic display. For example, each intra-frame pause segment may be applied to a different location on the electronic display. In some embodiments, multiple intra-frame pause segments may be applied during a single image frame. In some embodiments, the intra-frame pause segments may be applied to various image frames and at various location on the electronic display according to a pattern. To reduce band flickering that may be caused by the different locations of the intra-frame pause segments, an emission duty of one or more rows of pixels of the display may be adjusted.

20 Claims, 11 Drawing Sheets

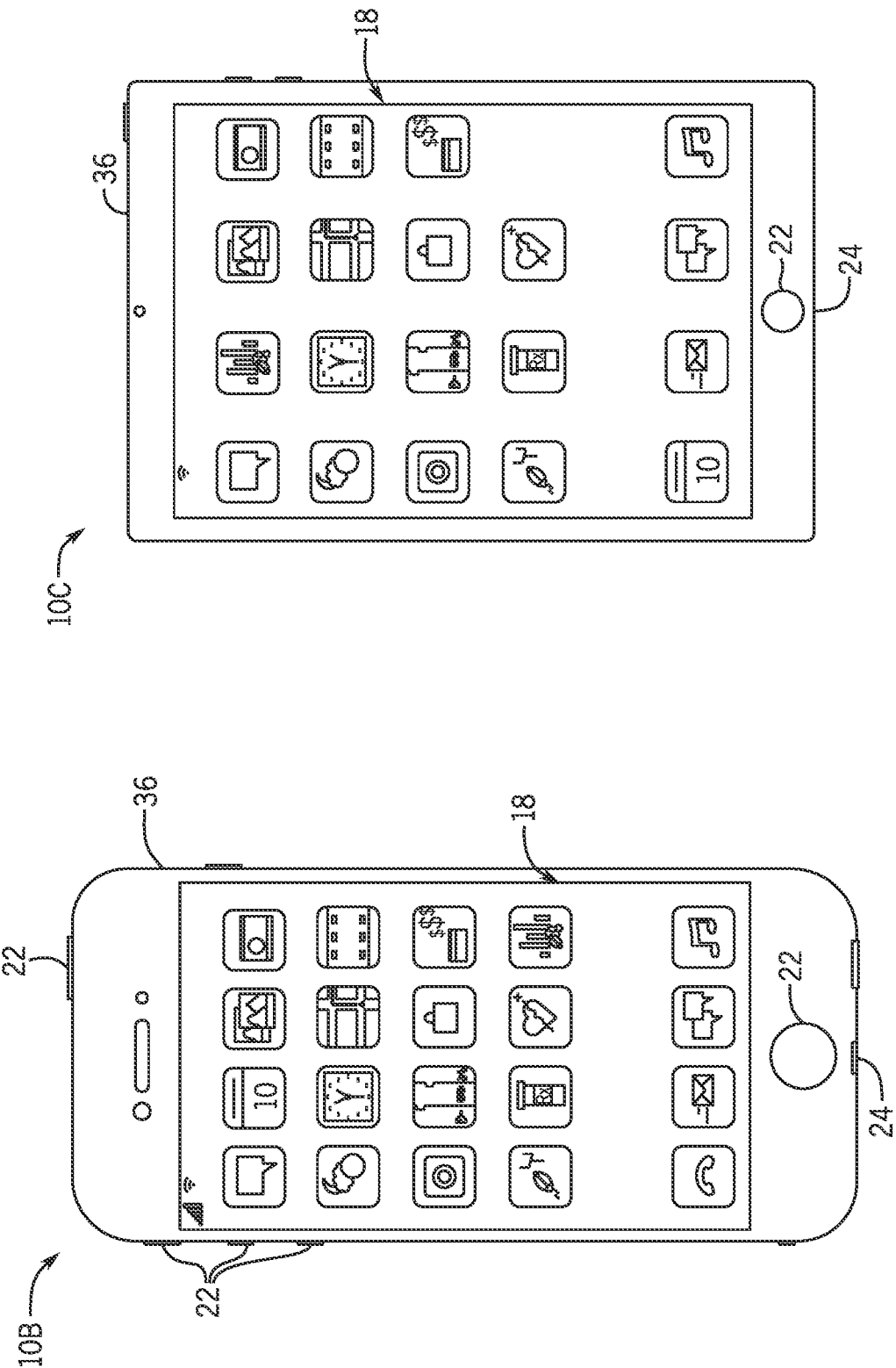

MITIGATION OF TEARING FROM INTRA-FRAME PAUSE

CROSS-REFERENCE TO RELATED APPLICATION

This application claims priority to and the benefit of U.S. Provisional Application No. 63/242,952 filed Sep. 10, 2021, entitled "MITIGATION OF TEARING FROM INTRA-FRAME PAUSE," which is hereby incorporated by reference in its entirety for all purposes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates generally to electronic displays, and more specifically, to mitigation of visual artifacts for electronic displays. In general, electronic displays enable information to be communicated to a user by displaying visual representations of the information. For example, the visual representations may include pictures, text, or videos and may be displayed as successive static image frames. Each image frame may be displayed by successively writing image data to rows of pixels in the electronic display.

The electronic display may also enable the user to communicate information to the electronic display and/or a computing system that includes the electronic display. For example, the electronic display may be a touch-sensitive display, which may detect a user's touch on the surface of the electronic display. More specifically, the electronic display may detect occurrence and/or position of the user touch based at least in part on an impedance (e.g., capacitance) change in the electronic display caused by the user's touch.

At any given time, the electronic display may generally either write image data to the display pixels or check for an impedance change via touch sensing, but not both. Thus, when image data is being written to the pixels, a user touch may be undetected. Similarly, when checking for a user touch, the electronic display may stop writing image data. As such, in operation, the electronic display may alternate between writing image data to the pixels and checking for a user touch. Touch detection accuracy may depend at least in part on a frequency at which the electronic display checks for impedance changes. However, temporarily interrupting the writing of image data with a greater number of impedance checks may introduce visual artifacts perceivable to the user.

The present disclosure generally relates to improving touch detection accuracy of touch-sensitive electronic displays while substantially reducing an occurrence of visual artifacts on the display. More specifically, the touch detection accuracy may be improved by increasing frequency an electronic display checks for a user touch. In fact, the electronic display may alternate between writing portions of image frames and checking for user touch. For example, the electronic display may write a first portion of an image frame to one or more pixels of the electronic display, pause the writing of the image frame, check for a user touch, and write a second portion of the image frame to additional pixels of the display. As used herein, pausing the writing of an image frame to check for a user touch is generally referred to as an "intra-frame pause."

However, pausing in the middle of writing an image frame may cause perceivable visual artifacts on the electronic display, particularly when the desired brightness level (e.g., grayscale value) between successively displayed image frames is different or changing. More specifically, an intra-frame pause may cause a small delay between writing the first portion of the image frame and writing the second portion of the image frame. In some embodiments, when the successively displayed image frames are changing brightness level (e.g., grayscale value), the delay may cause the brightness of the second portion to be perceptively different from the first portion even when both portions are supposed to be displaying the same brightness level.

For example, when the brightness is increasing, the second portion may be displayed darker than desired. On the other hand, when the brightness is decreasing, the second portion may be displayed brighter than desired. As an example, a location where the delay of an intra-frame pause occurs may cause a line through the display where a portion of a first image frame is displayed above the line and a portion of a second image frame is displayed below the line. That is, the portion of the first image frame on the display may appear to be shifted (e.g., horizontally and/or vertically) compared to the portion of the second image frame on the display. This visual artifact caused by the intra-frame pause may be referred to as "tearing."

The perceptibility of these artifacts may be accentuated when the intra-frame delay occurs at the same frame rendering position for successive frames. Accordingly, in some embodiments, timing of the intra-frame pauses may be varied during the rendering of each frame. In this manner, since a human eye generally averages the brightness level of a pixel over short durations of time (e.g., time to write one image frame), adjusting the location of intra-frame pauses may reduce the perception of intra-frame pause induced artifacts.

BRIEF DESCRIPTION OF THE DRAWINGS

Various aspects of this disclosure may be better understood upon reading the following detailed description and upon reference to the drawings described below.

FIG. 3 is a front view of a handheld device representing another embodiment of the electronic device of FIG. 1.

FIG. 4 is a front view of another handheld device representing another embodiment of the electronic device of FIG. 1.

DETAILED DESCRIPTION OF SPECIFIC EMBODIMENTS

Figure 1:
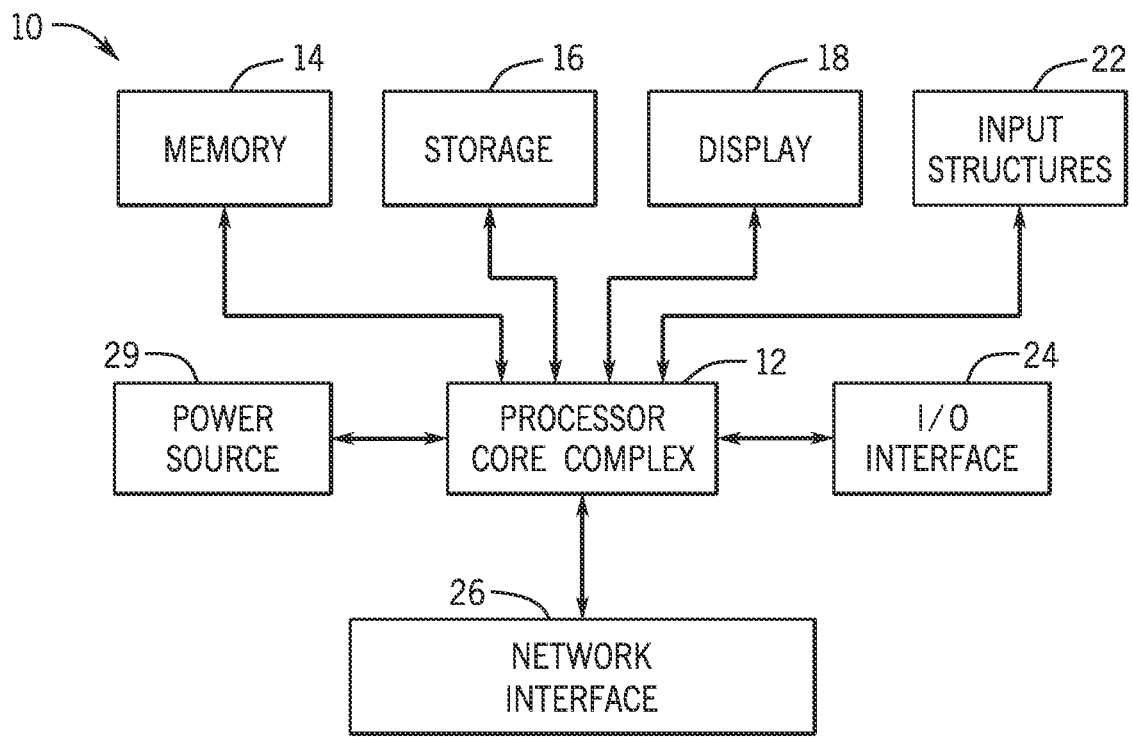
FIG. 1 is a block diagram of an electronic device, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Use of the term "approximately," "near," "about", and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

As mentioned above, a touch-sensitive electronic display may enable both the output of information to a user from a computing system as well as the input of control commands from the user to the computing system. More specifically, the electronic display may write image data to pixels to display visual representations of the information. Additionally, the electronic display may detect a user touch by checking for changes in impedance (e.g., capacitance) caused by the user touch on the surface of the electronic display.

Generally, an electronic display may alternate between writing image data and checking for a user touch. For example, the electronic display may write an entire image frame to the display pixels, check for a user touch, and repeat. However, the electronic display may only perform one of writing image data or checking for impedance changes at any given time. In other words, when the electronic display is writing image data to the pixels, a user touch during that period may go undetected.

To improve user touch detection, a frequency at which the electronic display checks for a user touch may be increased. For example, the electronic display may write a first portion of an image frame, pause the writing of the image frame, check for an impedance change, write a second portion of the image frame, pause the writing of the image frame, check for an impedance change, and so on. As used herein, pausing the writing of an image frame to check for a user touch is generally referred to as an "intra-frame pause" (IFP). Indeed, multiple intra-frame pauses may be inserted into a signal frame of image data written to the electronic display. In this manner, intra-frame pauses may enable the frequency at which the electronic display checks for a user touch to be increased, which may improve user touch detection accuracy.

However, the intra-frame pause between writing portions of an image frame may cause perceivable visual artifacts. As will be described in more detail below, artifacts may be more likely perceivable when placed at the same location on the electronic display and/or at the same render time of successively displayed image frames. More specifically, artifacts may be accentuated by appearing in the same location of a frame, due to the intra-frame pause occurring at a common time during frame rendering of successive frames.

Accordingly, one embodiment of the present disclosure describes an electronic display and technique that reduces the likelihood of perceivable visual artifacts by compensating for an intra-frame pause. In some embodiments, the electronic display may include a controller that may vary a timing of the intra-frame pauses (e.g., intra-frame pause segments) for successive frames adjusting an insertion time, a location, or a combination thereof, of the intra-frame pauses. Accordingly, any artifacts resulting from the intra-frame pauses will also be displayed in varied locations of successive frames and thus may be less perceivable to a human eye.

Embodiments presented herein include splitting (e.g., dividing) an intra-frame pause into a number of segments.

The segments of the intra-frame pause may be shorter in duration compared to the original intra-frame pause. In this way, visibility of a visual artifact caused by a particular segment may be reduced due to a shorter pause in writing an image frame to the electronic display.

In some embodiments, the segments of the intra-frame pause may be used to test for a user touch on the electronic display at various times and/or locations on the electronic display. That is, the segments of the intra-frame pause may be applied to various rows of pixels of the electronic display and thus may be applied at various times while an image frame is written to the electronic display. In this way, visibility of a visual artifact may be reduced by distributing (e.g., separating) any artifacts across the electronic display.

With the foregoing in mind, there are many suitable communication devices that may include and use the electronic display described herein. Turning first to FIG. 1, an electronic device 10 according to an embodiment of the present disclosure may include, among other things, a processor core complex 12 including one or more processor(s), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
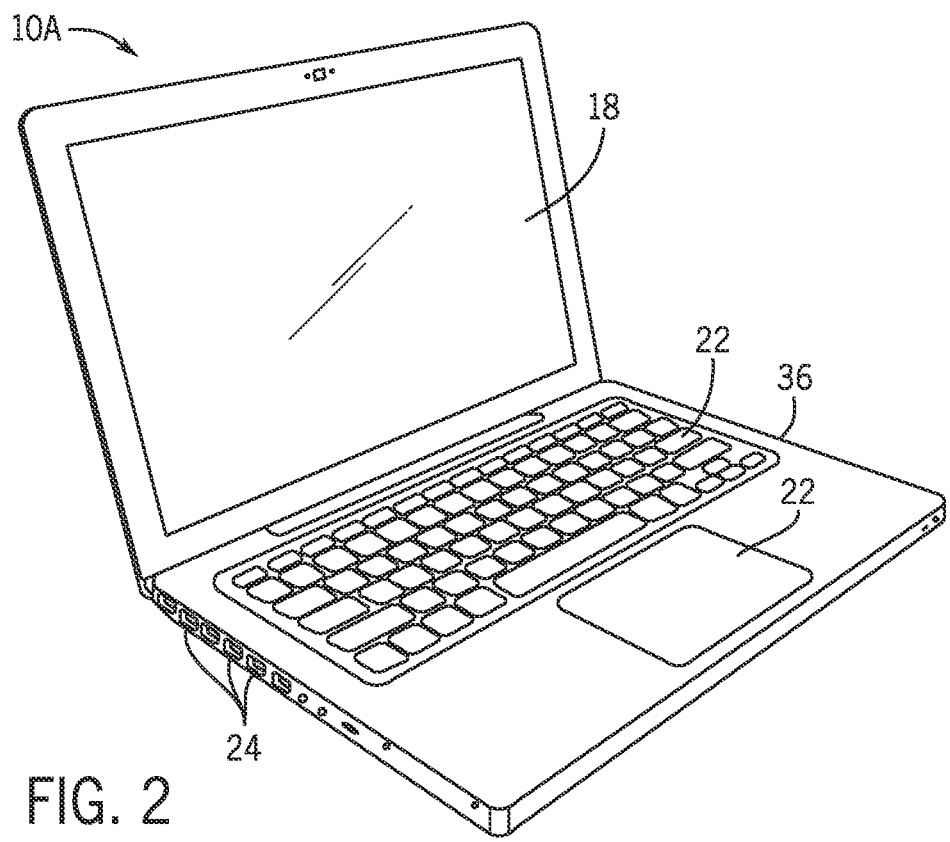
FIG. 2 is a perspective view of a notebook computer representing an embodiment of the electronic device of FIG. 1.
Figure 5:
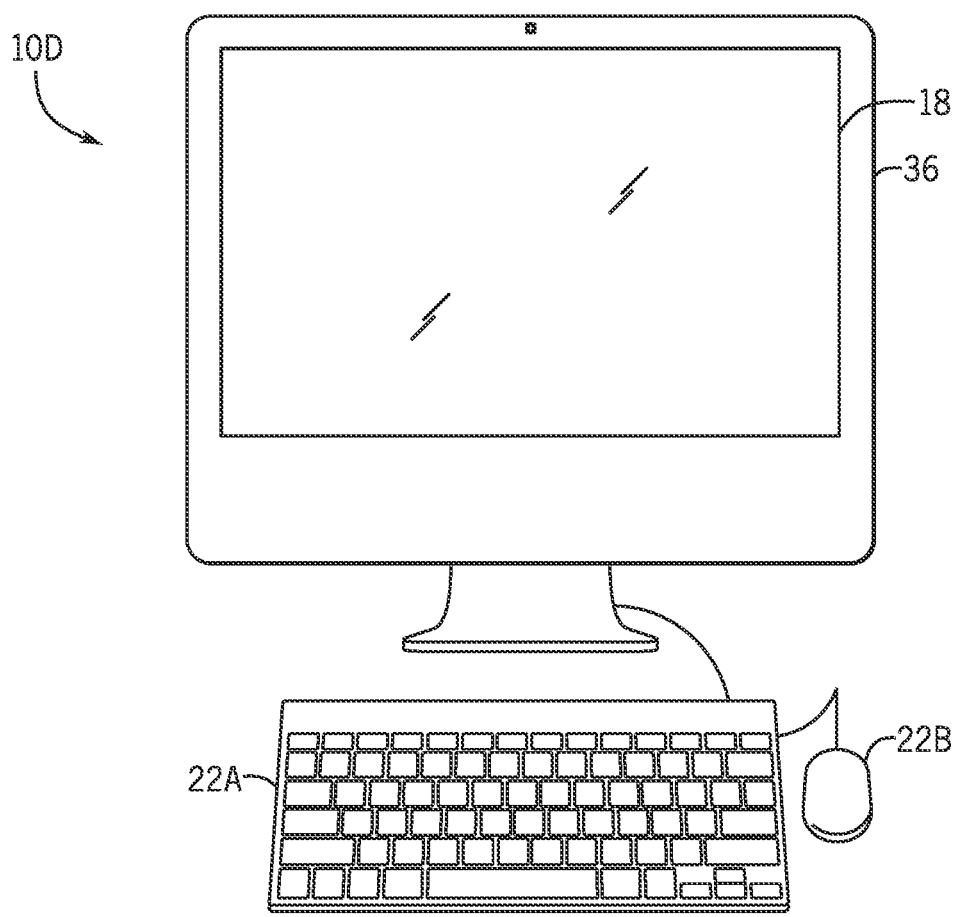
FIG. 5 is a front view of a desktop computer representing another embodiment of the electronic device of FIG. 1.
Figure 6:
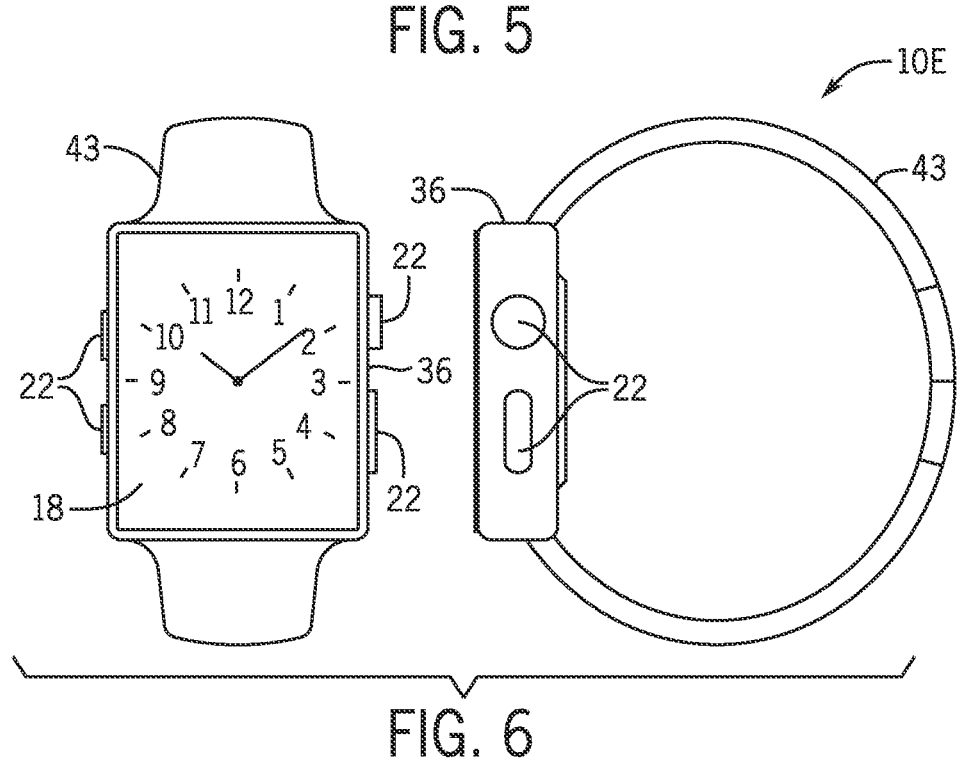
FIG. 6 is a perspective view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, software, hardware, or any combination thereof. Furthermore, the processor(s) 12 and other related items in FIG. 1 may be a single contained processing module or may be incorporated wholly or partially within any of the other elements within the electronic device 10.

In the electronic device 10 of FIG. 1, the processor(s) 12 may be operably coupled with a memory 14 and a nonvolatile storage 16 to perform various algorithms. Such programs or instructions executed by the processor(s) 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a BLUETOOTH® network, for a local area network (LAN) or wireless local area network (WLAN), such as an 802.11x WI-FI® network, and/or for a wide area network (WAN), such as a 3rd generation (3G) cellular network, universal mobile telecommunication system (UMTS), 4th generation (4G) cellular network, long term evolution (LTE®) cellular network, long term evolution license assisted access (LTE-LAA) cellular network, 5th generation (5G) cellular network, and/or New Radio (NR) cellular network. In particular, the network interface 26 may include, for example, one or more interfaces for using a Release-15 cellular communication standard of the 5G specifications that include the millimeter wave (mmWave) frequency range (e.g., 24.25-300 gigahertz (GHz)). The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth. The power source 29 of the electronic device 10 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may be generally portable (such as laptop, notebook, and tablet computers), or generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, Calif. By way of example, the electronic device 10, taking the form of a notebook computer 10A, is illustrated in FIG. 2 in accordance with one embodiment of the present disclosure. The depicted notebook computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a graphical user interface (GUI) and/or applications running on computer 10A. For example, a keyboard and/or touchpad may allow a user to navigate a user interface and/or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and/or to shield them from electromagnetic interference. The enclosure 36 may surround the display 18. The I/O interfaces 24 may open through the enclosure 36 and may include, for example, an I/O port for a hardwired connection for charging and/or content manipulation using a standard connector and protocol, such as the Lightning connector provided by Apple Inc. of Cupertino, Calif., a universal serial bus (USB), or other similar connector and protocol.

The input structures 22, in combination with the display 18, may allow a user to control the handheld device 10B. For example, the input structures 22 may activate or deactivate the handheld device 10B, navigate the user interface to a home screen, a user-configurable application screen, and/or activate a voice-recognition feature of the handheld device 10B. Other input structures 22 may provide volume control, or may toggle between vibrate and ring modes. The input structures 22 may also include a microphone that may obtain a user's voice for various voice-related features, and a speaker that may enable audio playback and/or certain phone capabilities. The input structures 22 may also include a headphone input that may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

FIG. 5 depicts a front view of a computer 10D, which may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or another similar device by Apple Inc. of Cupertino, Calif. It should be noted that the computer 10D may also represent a personal computer (PC) by another manufacturer. A similar enclosure 36 may be provided to protect and enclose internal components of the computer 10D, such as the display 18. In certain embodiments, a user of the computer 10D may interact with the computer 10D using various peripheral input structures 22, such as the keyboard 22A or mouse 22B (e.g., input structures 22), which may connect to the computer 10D.

FIG. 6 depicts a wearable electronic device 10E representing another embodiment of the electronic device 10 of FIG. 1, that may operate using the techniques described herein. By way of example, the wearable electronic device 10E, which may include a wristband 43, may be an Apple Watch® by Apple Inc. of Cupertino, Calif. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, LED display, OLED display, active-matrix organic light emitting diode (AMOLED) display, and so forth), as well as input structures 22, which may allow users to interact with a user interface of the wearable electronic device 10E.

As mentioned above, the electronic display 18 of the electronic device 10 may be used for displaying a visual representation of information to be communicated to a user and to detect an input from the user, such as a touch input. However, the display 18 may only perform one of these functions at a time. An intra-frame pause may be used to delay writing a portion of an image frame to the display. During the intra-frame pause, the display may, for example, check for a touch input. However, the intra-frame pause may cause a visual artifact to be visible on the display 18. For example, a location on the display 18 where the delay of an intra-frame pause occurs may cause a line through the display. A portion of a first image frame may be displayed above the line while a portion of a second image frame is displayed below the line. In some cases, the portion of the first image frame may appear to be shifted horizontally and/or vertically compared to the portion of the second image frame. This visual artifact may be referred to as "tearing." It should be understood that tearing is merely an example visual artifact caused by an intra-frame pause and that the intra-frame pause may cause various other visual artifacts, such as band flickering.

Embodiments presented herein provide various apparatus and techniques to reduce visual artifacts caused by an intra-frame pause. For example, to reduce tearing below a threshold of human visibility, a duration of the intra-frame pause may be divided into a number of segments. Each segment may represent a portion of the original intra-frame pause. That is, a total duration of the segments may be substantially the same as a duration of the original intra-frame pause. Advantageously, a shorter duration of each segment of the intra-frame pause may reduce the visibility of tearing on the display 18. That is, each segment of the intra-frame pause may cause tearing on the display but the shorter duration of the segments may keep the tearing below a threshold of human visibility.

In some embodiments, the visibility of tearing caused by the segments of the intra-frame pause may be further reduced by moving a location of the intra-frame pause segments between image frames. For example, a first segment of the intra-frame pause may be applied to a first row of pixels of the display and a second segment may be applied to a second row of pixels that is spaced apart (e.g., offset) from the first row of pixels. By spacing a location of the segments of the intra-frame pause, visibility of the tearing caused by each segment of the intra-frame pause may be reduced.

In some cases, changing a location of the intra-frame pause between image frames may cause band flickering on the display 18. Band flickering may refer to a change in a brightness (e.g., grayscale) level of one or more rows of pixels that is visible to the human eye during an image frame. For example, one or more rows of pixels between locations of the intra-frame pauses may have a brightness different than a target brightness for those pixels. In some cases, the change in brightness may be caused by an increased emission period (or non-emission period) for the row of pixels during the intra-frame pause. That is, a pixel that is emitting light before the intra-frame pause may continue to emit light during the intra-frame pause. Thus, an emission period of that pixel is increased resulting in an increased brightness. To reduce band flickering caused by changing a location of the segments of the intra-frame pause, embodiments herein may redistribute an emission duty ratio of one or more pixels. That is, a ratio of emission to non-emission by the pixel may be redistributed to reduce a visibility of the band flickering on the display 18.

Figure 7:
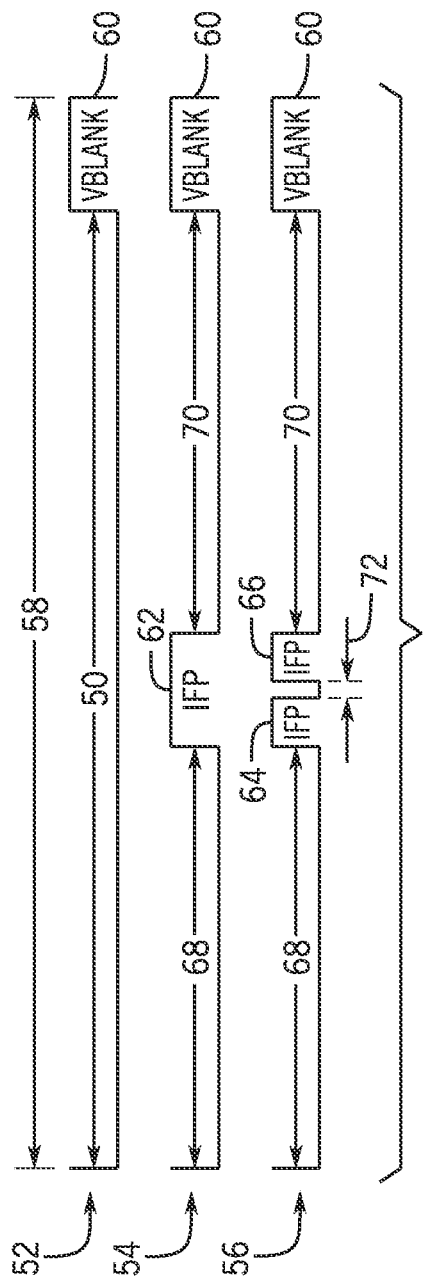
FIG. 7 illustrates example timing diagrams for image frames, according to an embodiment of the present disclosure.

With the foregoing in mind, FIG. 7 illustrates example timing diagrams for image frames, according to an embodiment of the present disclosure. A first timing diagram 52 for an image frame 58 includes an active frame 50 and a blanking frame 60. During the active frame 50, image data may be written to pixels of the display 18. The blanking frame 60 may represent a vertical blanking (VBLANK) period during which no data is written to nor displayed by the pixels of the display 18. In some embodiments, the image frame 58 may have a duration of about 5.833 milliseconds (ms).

A second timing diagram 54 for the image frame 58 includes the active frame 50 and the blanking frame 60. However, the active frame 50 is divided into a first portion 68 and a second portion 70 by an intra-frame pause (IFP) 62. As discussed above, writing image data to the pixels of the display 18 may stop during the intra-frame pause 62. During this time, for example, the display 18 may check for a touch input. In some cases, a length (e.g., duration) of the intra-frame pause 62 may be about 500 microseconds (μs).

In some embodiments, the intra-frame pause 62 may be divided into a number of segments (e.g., portions). A duration of the intra-frame pause segments may be determined based on a duration of the intra-frame pause 62. For example, the duration of the intra-frame pause segments may be determined by dividing a total duration of the intra-frame pause 62 by the number of intra-frame pause segments. Thus, if the intra-frame pause 62 is divided into two segments, each intra-frame pause segment may have a duration of one half of the duration of the original intra-frame pause 62 (e.g., about 250 μs). Similarly, if the intra-frame pause 62 is divided into three segments, each intra-frame pause segment may have a duration of one third of the duration of the original intra-frame pause 62 (e.g., about 166.667 μs), and so on.

A third timing diagram 56 for the image frame 58 includes the active frame 50 and the blanking frame 60. The active frame 50 includes the first portion 68 and the second portion 70 from the second timing diagram 54. However, the active frame also includes two intra-frame pauses 64 and 66. While two intra-frame pauses 64, 66 are depicted in the third timing diagram 56, it should be understood that any number of intra-frame pauses may be used according to the techniques discussed herein.

The intra-frame pauses 64, 66 may be representative of intra-frame pause segments of the intra-frame pause 62. Thus, a total duration of the intra-frame pause segments 64, 66 may be substantially equal to a duration of the intra-frame pause 62. That is, a duration of the intra-frame pause segments 64, 66 for each image frame may be equal to the duration of the intra-frame pause 62 divided by two (e.g., the number of intra-frame pauses 64, 66). In some cases, the intra-frame pause segments 64, 66 be spaced apart from each other by a spread 72. The spread 72 may correspond to a time period between and/or a physical distance (e.g., a number of rows of pixels on the display 18) between applications of the intra-frame pause segments 64, 66.

Advantageously, dividing an intra-frame pause into a number of segments may reduce a perceptibility of visual artifacts by reducing a time period during which the visual artifacts may be generated. For example, an intra-frame pause having a relatively long duration may cause a more pronounced visual artifact compared to a visual artifact caused by an intra-frame pause with a relatively short duration. Thus, the intra-frame pause segments may reduce the perceptibility (e.g., visibility) of the resulting visual artifacts.

Figure 8:
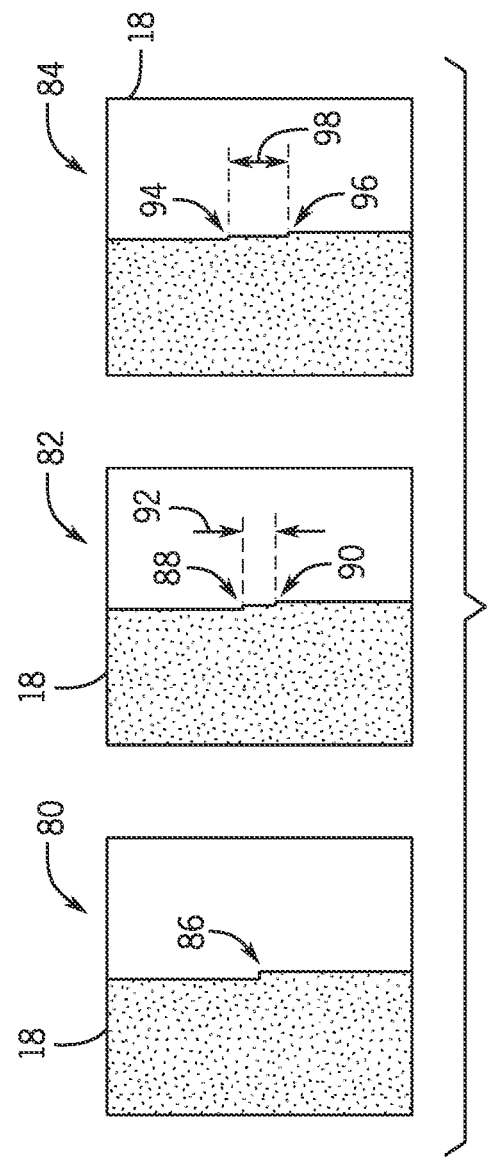
FIG. 8 illustrates example visual artifacts based on the timing diagrams of FIG. 7, according to an embodiment of the present disclosure.

FIG. 8 illustrates example visual artifacts based on the timing diagrams of FIG. 7, according to an embodiment of the present disclosure. The visual artifacts in FIG. 8 may correspond to the timing diagrams 54 and 56 discussed with respect to FIG. 7. For example a first frame 80 may correspond to the timing diagram 54 having a single intra-frame pause 62. A second frame 82 and a third frame 84 may correspond to the timing diagram 56 having two intra-frame pause segments 64 and 66. As shown, the first frame 80, the second frame 82, and the third frame 84 may correspond to an image frame on the display 18. It should be noted that while the visual artifacts discussed with respect to FIG. 8 are examples of screen tearing, the same techniques discussed herein may be applied to mitigate other types of visual artifacts.

As shown, the first frame 80 includes a first visual artifact 86 (e.g., screen tearing. A location of the first visual artifact 86 on the display 18 may correspond to a time or location that the intra-frame pause 62 of FIG. 7 is applied to the display 18. That is, the first visual artifact 86 may be caused by the delay in writing image data to the display during the intra-frame pause 62. The first visual artifact 86 is visible to the human eye because the duration of the intra-frame pause 62 is relatively long.

As discussed above, to reduce the visibility (e.g., perceptibility) of the visual artifact 86, embodiments presented herein may divide the corresponding intra-frame pause 62 into a number of intra-frame pause segments 64, 66. Each of the intra-frame pause segments 64, 66 may cause a visual artifact on the display 18. However, the visual artifacts caused by the intra-frame pause segments 64, 66 may be smaller (i.e., less visible or less perceptible) compared to a longer intra-frame pause, such as the intra-frame pause 62. For example, the second frame 82 depicts two visual artifacts 88, 90 on the display 18 which may result from the intra-frame pause segments 64, 66, respectively, being applied to the display 18. The visual artifacts 88, 90 may be smaller (e.g., closer to a visibility threshold) than the first visual artifact 86 that results from the longer intra-frame pause 62.

As shown, the visual artifacts 88, 90 may be spaced apart on the display 18 by a distance 92. The distance 92 may correspond to the spread 72 between the intra-frame pause segments 64, 66. That is, the distance 92 may be directly related to the spread 72. Thus, the distance 92 may increase as the spread 72 increase and the distance 92 may decrease when the spread 72 decreases.

As discussed above, the visual artifacts 88, 90 caused by the intra-frame pause segments 64, 66 may be less visible to a human eye than the artifact 86 caused by the intra-frame pause 62 because a duration of the intra-frame pause segments 64, 66 is smaller than a duration of the intra-frame pause 62. Visibility of the visual artifacts 88, 90 may be further reduced by increasing the distance 92. In other words, visibility of the visual artifacts 88, 90 may be reduced by increasing the spread 72 between the corresponding intra-frame pause segments 64, 66.

As an example, the third frame 84 illustrates two visual artifacts 94, 96 which may correspond to the visual artifacts 88, 90 in the second frame 82. However, as shown, a distance 98 between the visual artifacts 94, 96 is larger than the distance 92 in the second frame 82. The larger distance 98 may be achieved by separating the intra-frame pause segments 64, 66 by a larger spread 72. Advantageously, the larger distance 98 may result in a reduced visibility of the visual artifacts 94, 96. That is, due to the relatively short time period of the image frame 58 on the display, the visual artifacts 94, 96 (and 88, 90) may be below a threshold of human visibility (e.g., a visibility threshold).

Figure 9A:
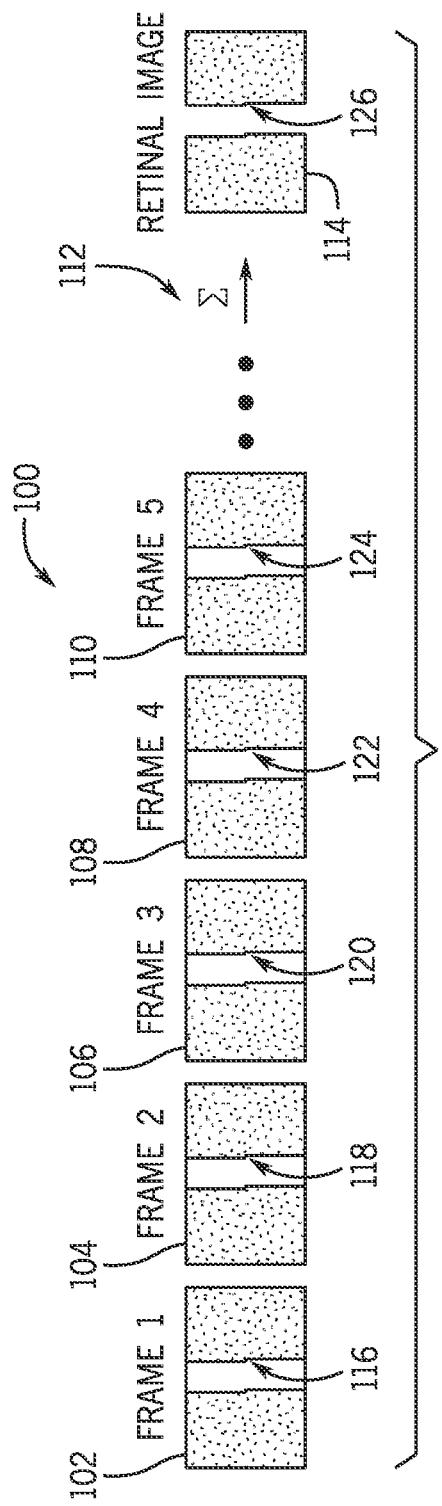
FIG. 9A is an example composite image formed by an intra-frame pause in a single location on the electronic display.

FIG. 9A is an example composite image 114 formed by an intra-frame pause in a single location on the electronic display. The composite image (e.g., a retinal image) 114 is formed by combining (e.g., via summation 112) a number of image frames. For example, the composite image 114 may be formed by combining a first frame 102, a second frame 104, a third frame 106, a fourth frame 108, a fifth frame 110, and so on. It should be noted that any number of image frames may be used to generate the composite image 114.

As shown, each image frame 102, 104, 106, 108, 110 includes a corresponding visual artifact 116, 118, 120, 122, 124, respectively, caused by an intra-frame pause being applied during each image frame. When the image frames 102, 104, 106, 108, 110 are combined to generate the composite image 114, the visual artifacts 116, 118, 120, 122, 124 are also combined. Thus, a visual artifact 126 in the composite image 114 may be a combination of the visual artifacts the visual artifacts 116, 118, 120, 122, 124 of the corresponding image frames.

Figure 9B:
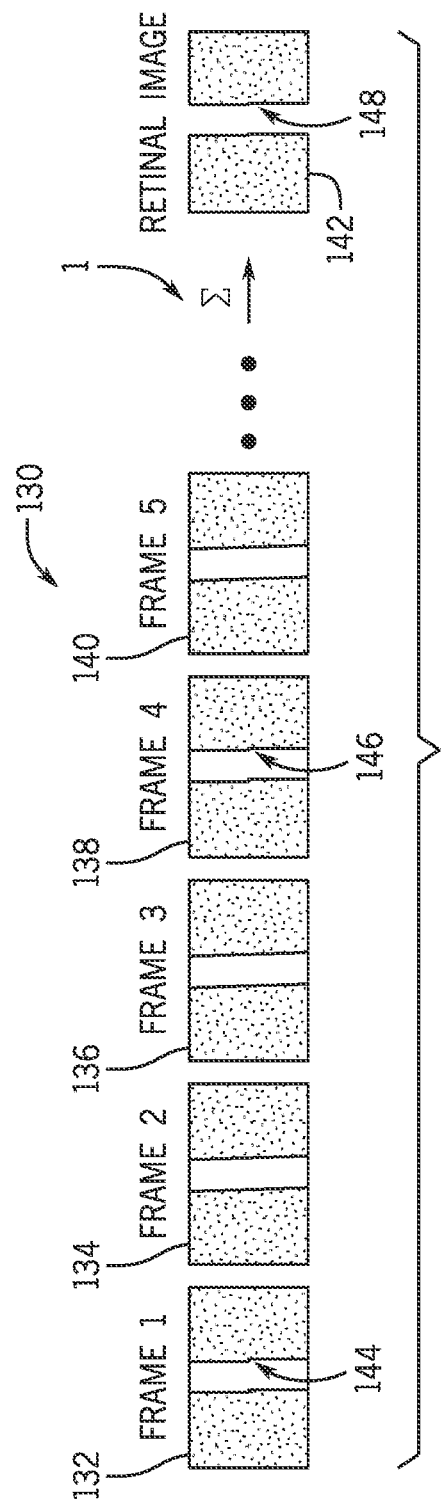
FIG. 9B is an example composite image formed by varying a location of the intra-frame pause at different image frames, according to an embodiment of the present disclosure.

Some embodiments presented herein may reduce a number of intra-frame pauses thereby reducing a number of image frames 102, 104, 106, 108, 110 with a visual artifact. In this way, reducing a number of intra-frame pauses may also reduce a visibility of the visual artifact 126 in the composite image 114. For example, FIG. 9B shows an example composite image 142 formed by varying an image frame during which an intra-frame pause (e.g., an intra-frame pause segment) is applied to the display 18.

As shown, the composite image 142 is generated by combining the image frames 102-110, similar to generating the composite image 114 of FIG. 9A. However, in FIG. 9B only the first image frame 102 and the fourth image frame 108 have a visual artifact 144,146, respectively, resulting from an intra-frame pause (or intra-frame pause segment) applied during the first image frame 102 and the fourth image frame 108. An intra-frame pause is not applied during the second image frame 104, third image frame 106, or fifth image frame 110. In other words, an intra-frame pause (or intra-frame pause segment) may be applied to every third image frame written to the display 18.

Spreading the intra-frame pauses (or intra-frame pause segments) by a number of image frames may reduce a visibility of a visual artifact in the composite image 142. For example, a visual artifact in the composite images 114, 142 is a cumulative visual artifact from the addition of visual artifacts in the image frames 102-110. Thus, a smaller number of visual artifacts in the image frames 102-110 results in a visual artifact in the composite image that is less perceivable to the human eye (e.g., less visible). Accordingly, embodiments presented herein provide techniques and apparatus to reduce a number of visual artifacts in the image frames 102-110 that are used to generate the composite image 142, and thus reduce a visibility of a visual artifact in the composite image 142.

Figure 10:
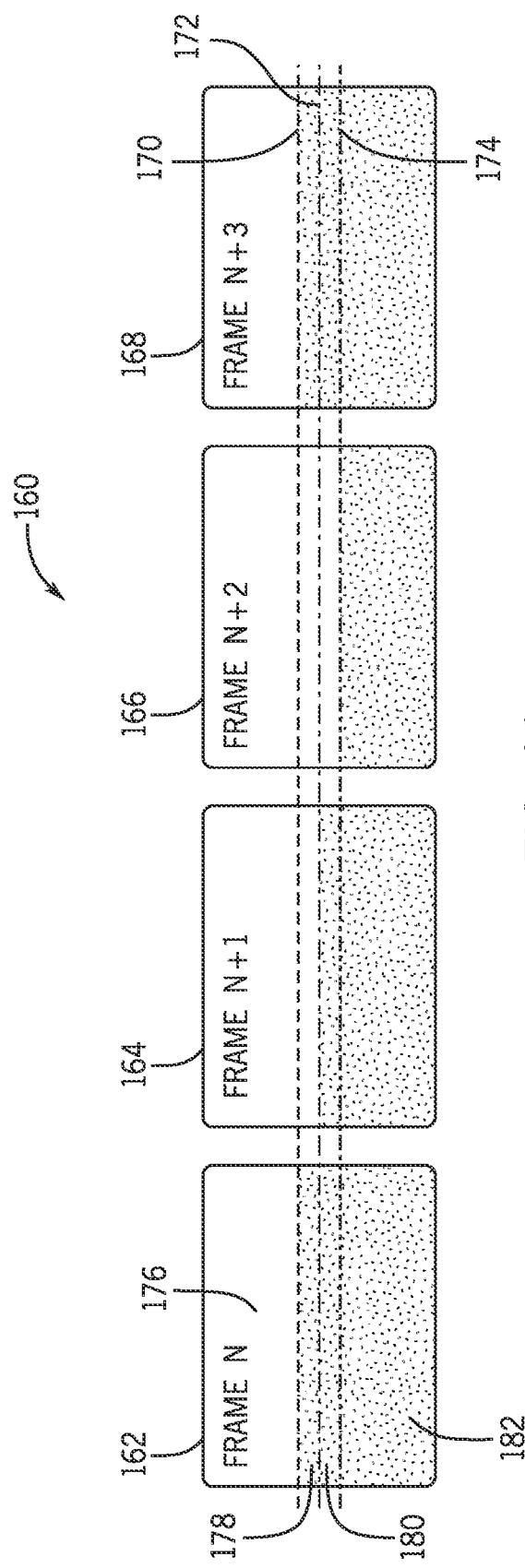
FIG. 10 illustrates an example pattern of intra-frame pauses applied to image frames at various locations on the display, according to an embodiment of the present disclosure.

FIG. 10 illustrates an example pattern 160 of intra-frame pauses applied to image frames at various locations on the display 18, according to an embodiment of the present disclosure. In addition to varying a number of image frames between intra-frame pauses, a location of the intra-frame pauses may also be changed from frame-to-frame. As shown, a number of consecutive image frames 162-168 include an intra-frame pause applied therein. While the intra-frame pauses discussed with respect to FIG. 10 are applied to consecutive image frames, it should be understood that application of the intra-frame pauses may be spaced by one or more image frames. That is, the intra-frame pauses may not be applied to consecutive image frame but applied, for example, once every fourth image frame. Further, as discussed herein, a location of the intra-frame pauses in the display 18 may be varied between the image frames 162-168.

As shown, the display 18 may be divided into various portions based on when an intra-frame pause is applied. For example, a first portion 176 of the display 18 may have image data written thereto before a first intra-frame pause is applied at a first location 170 on the display 18. A second portion 178 of the display 18 may have image data written thereto between the first intra-frame pause and a second intra-frame pause applied at a second location 172 on the display 18. A third portion 180 of the display 18 may have image data written thereto between the second intra-frame pause and a third intra-frame pause applied at a third location 174 on the display 18. A fourth portion 182 of the display 18 may have image data written thereto after the third intra-frame pause.

When an intra-frame pause is applied to the display, image data written to subsequent portions of the display 18 may be delayed. For example, when the intra-frame pause (or intra-frame pause segment) is applied at the first location 170, writing image data to the second portion 178, the third portion 180, and the fourth portion 182 may be delayed by a duration of that intra-frame pause. After the third intra-frame pause is applied at the third location 174, the next intra-frame pause may be applied at the first location 170. That is, the pattern 160 and locations 170, 172, 174 of the intra-frame pauses may repeat. Advantageously, applying the intra-frame pauses (or intra-frame pause segments) at different locations 170, 172, 174 on the display may reduce a visibility (e.g., perception) of a visual artifact on the display 18.

Figure 11:
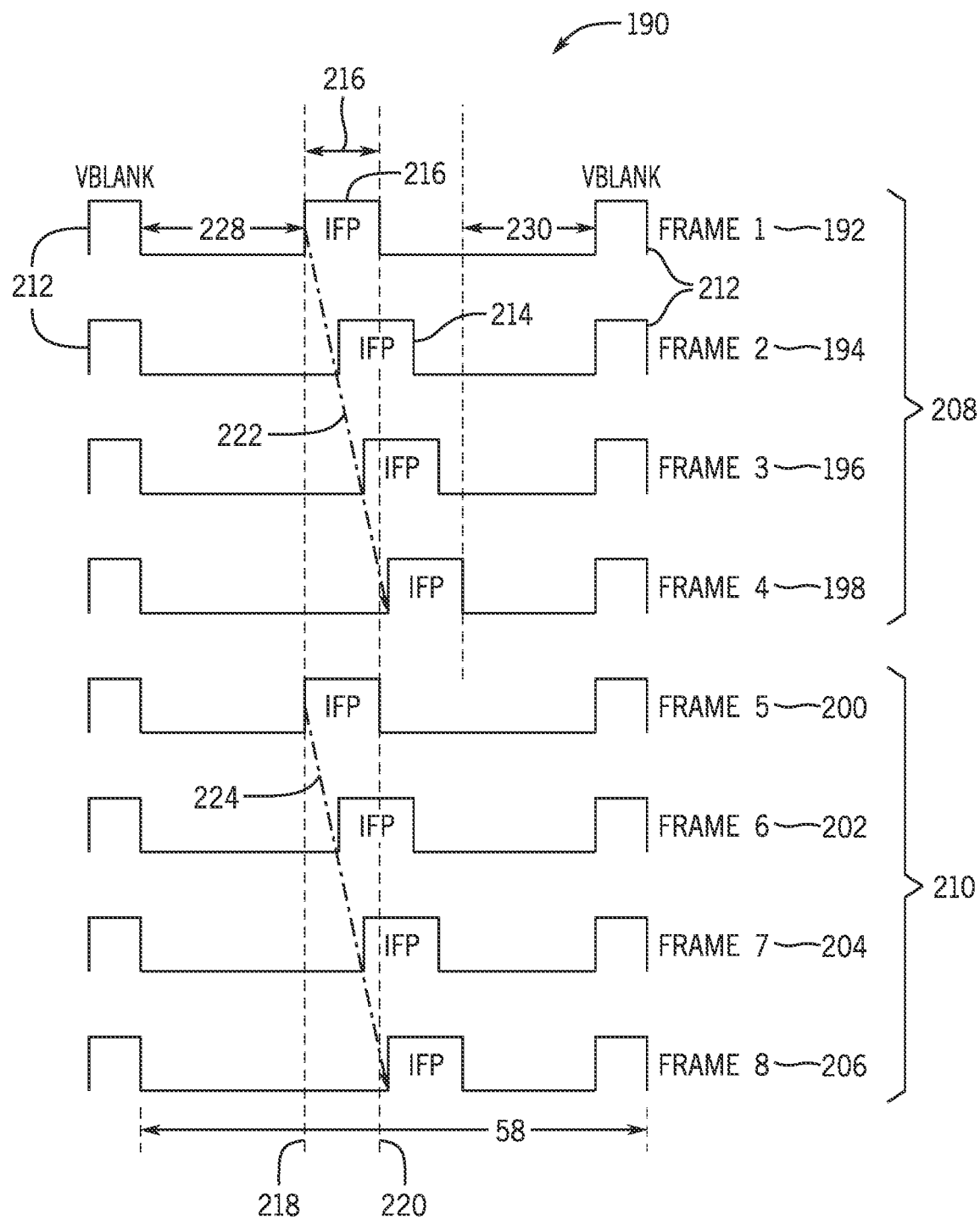
FIG. 11 illustrates an example sequence for varying a location of the intra-frame pause, according to an embodiment of the present disclosure.

FIG. 11 illustrates an example sequence 190 for varying a location of the intra-frame pauses, according to an embodiment of the present disclosure. While the example sequence 190 shows a single intra-frame pause, it should be understood that the example sequence 190 may be used to apply multiple intra-frame pauses and/or multiple intraframe pause segments per image frame. As shown, the example sequence 190 begins at the first image frame 192. The first image frame 192 includes one or more blanking frames 212 and an intra-frame pause 214. The intra-frame pause may divide an active frame into a first portion and a second portion, as discussed with respect to FIG. 7 above.

During a second image frame 194, a location of the intra-frame pause 214 may be shifted (e.g., by a time and/or a location on the display 18) within the active frame relative to a location of the intra-frame pause applied during the first image frame 192. Similarly, a location of the intra-frame pause 214 may be shifted during a third image frame 196 and a fourth image frame 198, relative to a previously applied intra-frame pause 214.

The locations of the intra-frame pauses 214 applied during the first image frame, the second image frame, the third image frame, and the fourth image frame may form a pattern 208. The pattern 208 may be repeated every four image frames written to the display. A pattern 210 may be substantially similar to the pattern 208 and may be applied to a fifth image frame 200, a sixth image frame 202, a seventh image frame 204, and an eighth image frame 206.

That is the pattern 208, 210 may be repeated every four image frames written to the display 18.

A duration 216 of the intra-frame pause may be determined based on a start point 218 and an endpoint 220. The duration 216 of the intra-frame pause 214 applied during the first image frame 192 may determine a range within which subsequent intra-frame pauses are applied. For example, the endpoint 220 of the intra-frame pause 214 applied during the first image frame 192 may correspond to a start point of the intra-frame pause 214 applied during the fourth image frame 198 (e.g., a last image frame of the pattern 208). The other intra-frame pauses 214 applied between the first image frame 192 and the fourth image frame 198 may have a start point that occurs during the duration of the intra-frame pause 214 applied during the first image frame 192.

Figure 12:
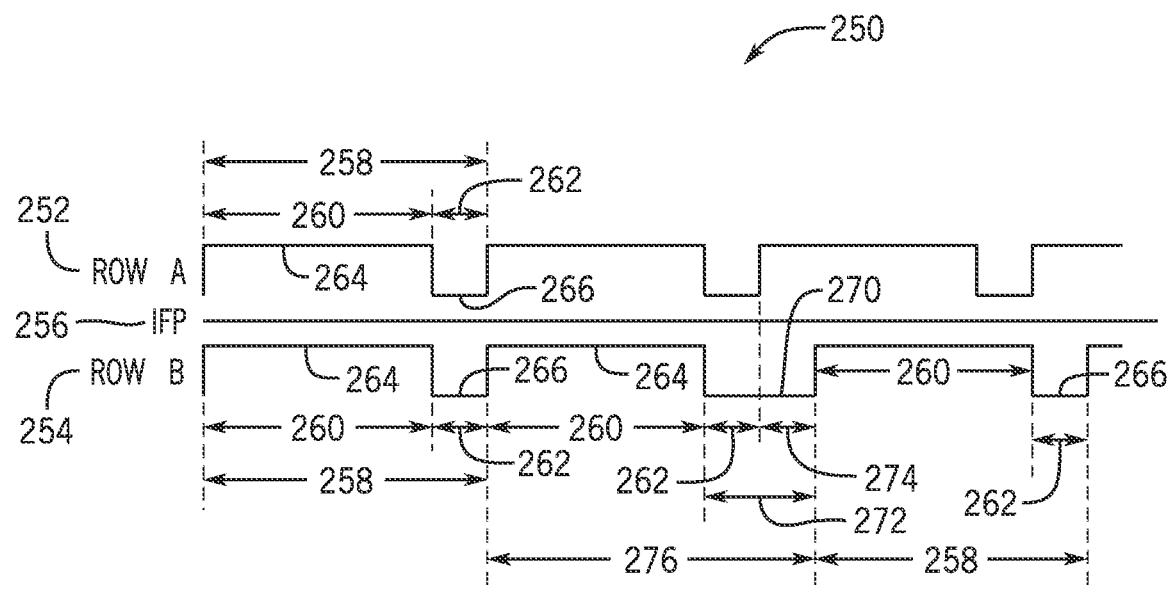
FIG. 12 illustrates an example timing diagram for emission of pixel rows of the electronic display with an intra-frame pause, according to an embodiment of the present disclosure.

FIG. 12 illustrates an example timing diagram 250 for emission of pixel rows of the electronic display 18 with an intra-frame pause, according to an embodiment of the present disclosure. As discussed above, changing a location of an intra-frame pause between image frames may cause band flickering on the display 18. To reduce band flickering, an emission duty (e.g., an emission period compared to a non-emission period) of one or more pixels of the display 18 may be adjusted.

As shown, the timing diagram includes an emission pattern for a first row 252 of pixels (e.g., Row A) and a second row 254 of pixels (e.g., Row B). An intra-frame pause may be applied to the display 18 between writing image data to the first row 252 and the second row 254. Pixels of the first row 252 and the second row 254 may emit light during an emission period 264 and may not emit light during a non-emission period 266. That is, a logic high value may correspond to the emission period 264 while a logic low value may correspond to the non-emission period 266. A ratio of the duration 260 of the emission period 264 to the duration 262 of the non-emission period 266 may be about 4:1. That is, a duration 260 of the emission period 264 may be about four times longer than a duration 262 of the non-emission period 266.

When the intra-frame pause 256 is applied to the display 18, the non-emission period 266 of the subsequent row (e.g., the second row 254) may be delayed. For example, during a second image frame 276, a duration 262 of the non-emission period 270 may be increased by a duration 279 of the intra-frame pause 256. That is, a duration 272 of the non-emission period 270 may be equal to the duration 262 of the non-emission period 266 without an intraframe pause and a duration 274 of the intra-frame pause 256 itself (e.g., 500 µs). In this way, the intra-frame pause 256 may cause the ratio of the duration 260 of the emission period 264 to the duration 272 of the non-emission period 270 to change for one or more rows of pixels after the intra-frame pause 256 is applied. The change in the emission ratio may result in the band flickering being visible to the human eye.

That is, the duration 274 of the intra-frame pause 256 may result in a change in a brightness (e.g., grayscale) level of one or more rows of pixels that is visible to the human eye during the image frame. To reduce the visibility of the band flickering, the emission ratio may be adjusted, as discussed below.

Figure 13:
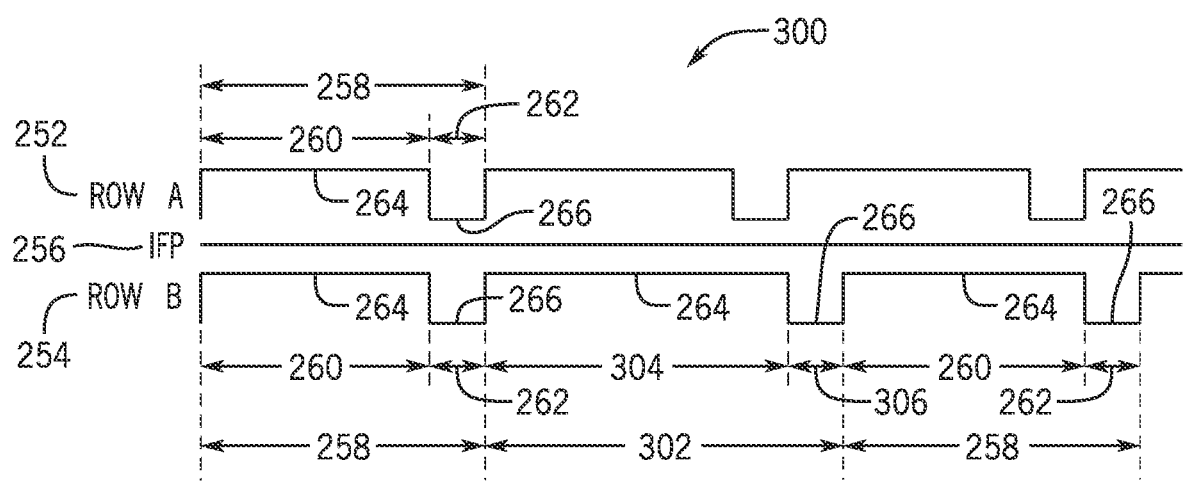
FIG. 13 illustrates an example timing diagram for emission of pixel rows of the electronic display with emission duty redistribution, according to an embodiment of the present disclosure.

FIG. 13 illustrates an example timing diagram 300 for emission of pixel rows of the electronic display with emission duty redistribution, according to an embodiment of the present disclosure. As shown, the intra-frame pause 256 is applied between the first row 252 and the second row 254. However, during the second image frame 302 of the second row 254, the emission ratio is adjusted such that a duration 304 of the emission period 264 to the duration 306 of the non-emission period 266 is 4:1. That is, the duration 304 of the emission period 264 of the second row 254 may be increased to be larger than duration 260 of the emission period 264 of the first row 252. Similarly, the duration 306 of the non-emission period 266 of the second row 254 may be increased to be larger than the duration 262 of the non-emission period 266 of the first row 252. In this way, the emission ratio of each pixel row of each image frame may be substantially similar and may reduce the visibility of bank flickering on the display 18.

Figure 14:
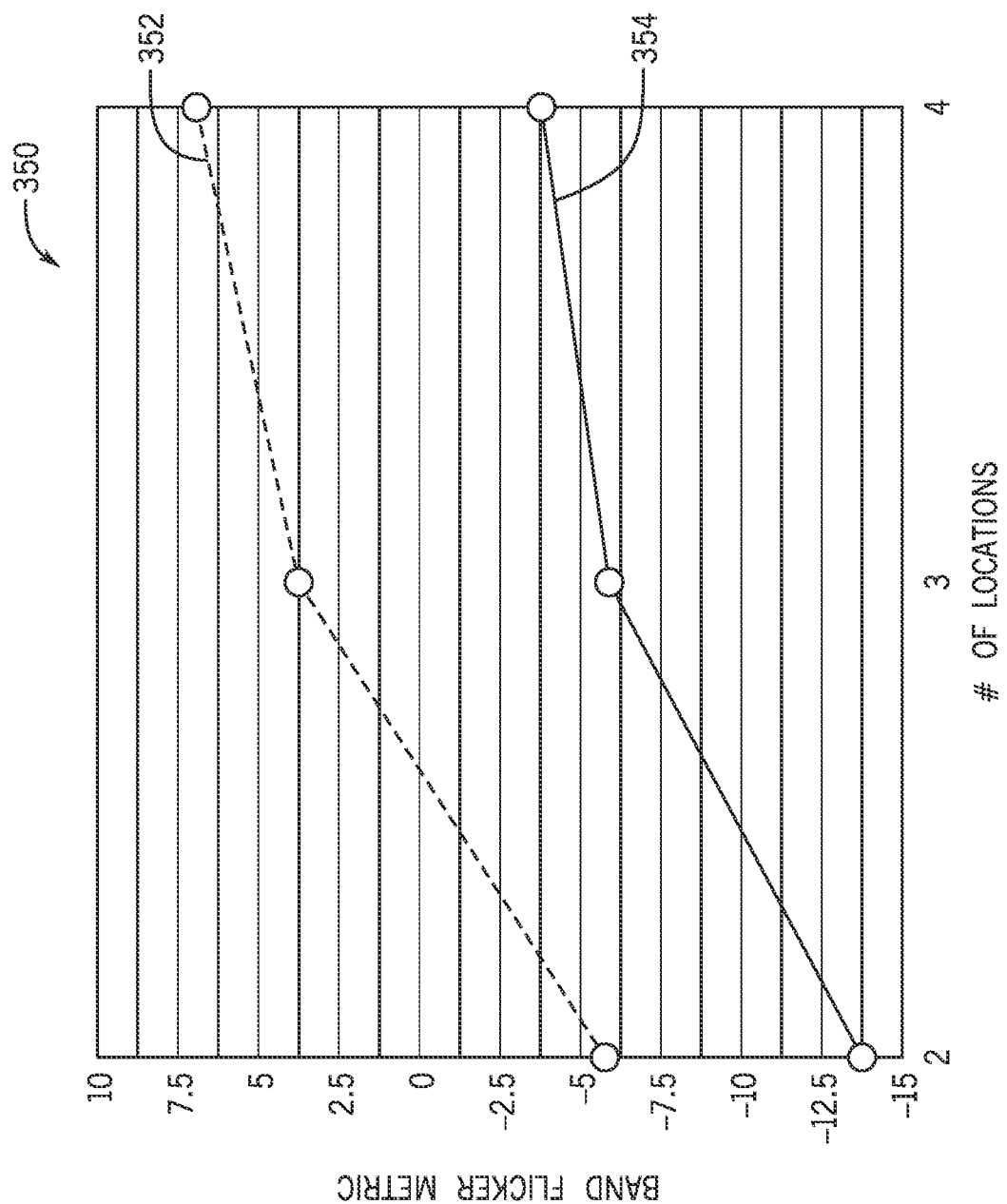
FIG. 14 is a graph illustrating band flicker mitigation with and without the emission duty redistribution discussed with respect to FIG. 13, according to an embodiment of the present disclosure.

FIG. 14 is a graph 350 illustrating band flicker mitigation with and without the emission duty redistribution discussed with respect to FIG. 13, according to an embodiment of the present disclosure. As shown, a vertical axis of the graph 350 is representative of a band flicker metric of the display 18. The band flicker metric may be associated with a perceivability of band flicker on the display 18. A horizontal axis of the graph 350 is representative of a number of locations on the display 18 at which the intra-frame pauses (or intra-frame pause segments) are applied. A first line 352 is representative of the band flicker metric for the display 18 with one or more intra-frame pauses applied without emission duty redistribution. A second line 354 is representative of the band flicker metric for the display 18 with one or more intra-frame pauses applied with emission duty redistribution.

As shown, the emission duty redistribution of the second line 354 reduces the band flicker metric of the display 18, regardless of the number of locations of the intra-frame pauses. Thus, the graph 350 illustrates an improvement of band flickering as a result of the emission duty redistribution, as discussed herein.

Figure 15A:
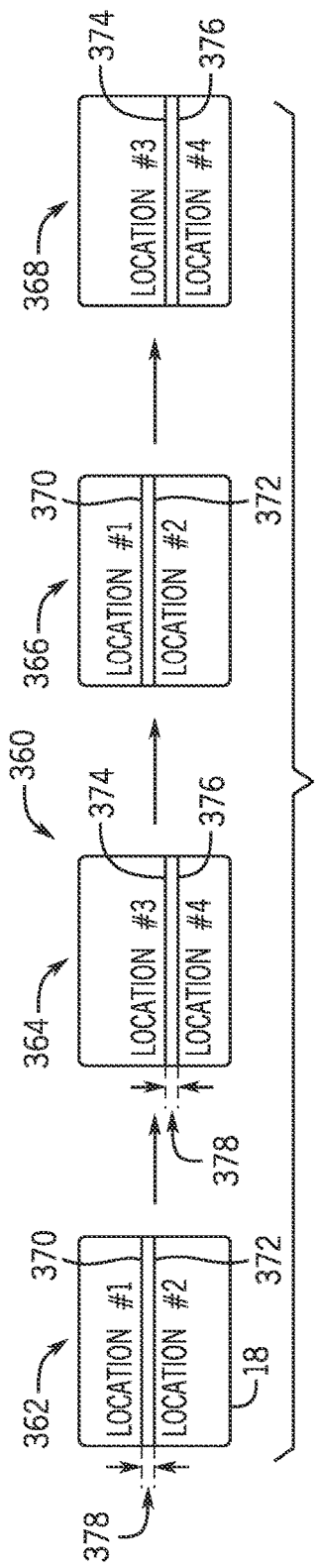
FIG. 15A illustrates an example sequence of split intra-frame pauses applied to various locations of the electronic display with consistent spacing, according to an embodiment of the present disclosure.

FIG. 15A illustrates an example sequence 360 of split intra-frame pauses (e.g., intra-frame pause segments) applied at various locations of the electronic display 18 with consistent spacing, according to an embodiment of the present disclosure. While the intra-fame pauses discussed with respect to FIG. 15A have consistent spacing, it should be understood that this is one implementation and that many other implementations are possible.

As shown, during a first image frame 362, an intra-frame pause (or intra-frame pause segment) is applied at a first location 370 and a second location 372. The first location 370 and the second location 372 are separated by a distance 378 (e.g., a number of rows of pixels of the display 18). During a second image frame 364, an intra-frame pause is applied at a third location 374 and a fourth location 376. The third location 374 and the fourth location 376 are separated by the distance 378. That is, the third location 374 and the fourth location 376 are separated by the same distance 378 as the first location 370 and the second location 372. As shown, the locations of the intra-frame pauses in the first image frame 362 and the second image frame 364 are repeated for a third image frame 366 and a fourth image frame 368. That is, intra-frame pauses are applied at the first location 370 and the second location 372 during the third image frame 366 and at the third location 374 and the fourth location 376 during the fourth image frame 368. In this way, the locations of the intra-frame pauses change between consecutive image frames and thus may reduce a visibility of any visual artifacts that may be caused thereby.

Figure 15B:
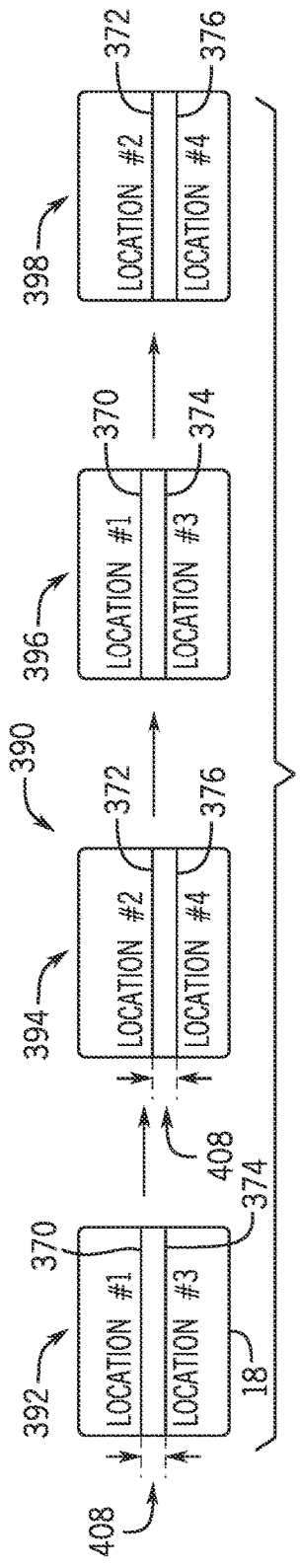
FIG. 15B illustrates an example sequence of split intra-frame pauses applied to various locations of the electronic display with consistent spacing, according to an embodiment of the present disclosure.

FIG. 15B illustrates an example sequence 360 of split intra-frame pauses (e.g., intra-frame pause segments) applied at various locations of the electronic display 18 with consistent spacing, according to an embodiment of the present disclosure. The locations of the intra-frame pauses in FIG. 15B may correspond to the locations of the intra-frame pauses in FIG. 15A. However, combinations of the locations of the intra-frame pauses of a particular image frame may be changed.

As shown, a first image frame 392 includes an intra-frame pause (or intra-frame pause segment) at the first location 370 and at the third location 374. A second image frame 394 includes an intra-frame pause at the second location 372 and the fourth location 376. A distance 408 between the first location 370 and the third location 374 may be substantially the same as the distance 408 between the second location 372 and the fourth location 376. The distance 408 may be greater or less than the distance 378 discussed with respect to FIG. 15A. Similar to FIG. 15A, the locations of the intra-frame pauses applied to the first image frame 392 and the second image frame 394 may be repeated for the third image frame 396 and the fourth image frame 398.

Figure 15C:
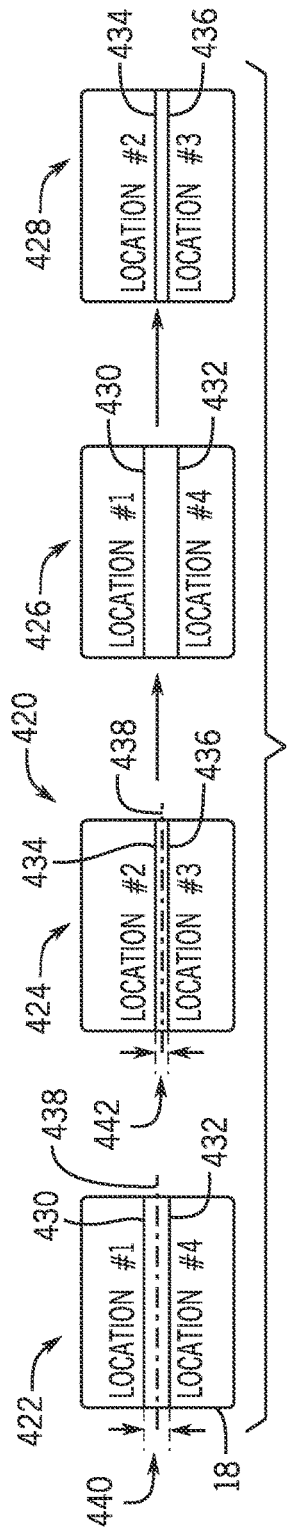
FIG. 15C illustrates an example sequence of split intra-frame pauses applied to various locations of the electronic display with consistent spacing relative to a center point, according to an embodiment of the present disclosure.

FIG. 15C illustrates an example sequence 420 of split intra-frame pauses (or intra-frame pause segments) applied to various locations of the electronic display 18 with consistent spacing relative to a center point, according to an embodiment of the present disclosure. As shown, a first image frame 422 includes an intra-frame pause at a first location 430 on the display 18 and a second location 432 on the display 18. The first location 430 and the second location 432 are separated by a distance 440 that is centered about a third location on the display 18.

During a second image frame 424, an intra-frame pause is applied at a fourth location 434 and a fifth location 436. The fourth location 434 and the fifth location 436 are separated by a distance 442 that is centered about the third location 438. The distance 442 between the fourth location 434 and the fifth location 436 may be less than the distance 440 between the first location 430 and the second location 432. The locations of the intra-frame pauses applied during the first image frame 422 and the second image frame 424 may be repeated for the third image frame 426 and the fourth image frame 428, respectively.

Figure 16:
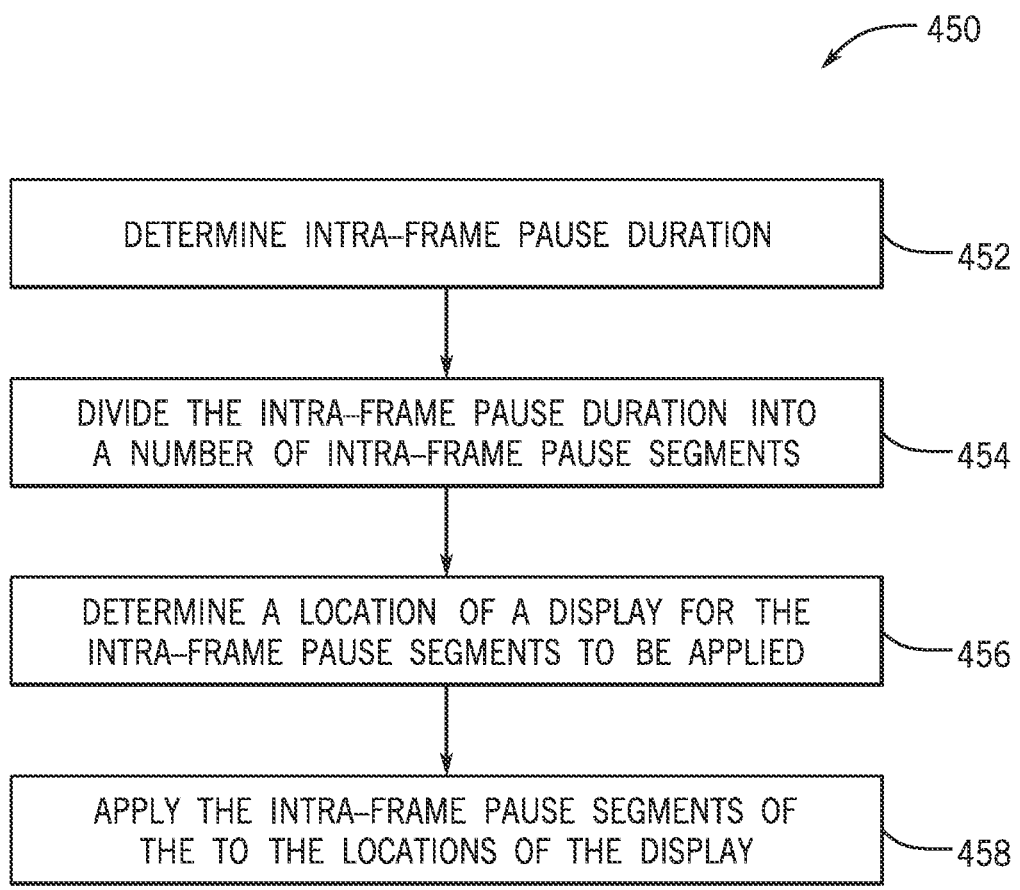
FIG. 16 is a flowchart depicting operations for applying a split intra-frame pause to the electronic display, according to an embodiment of the present disclosure.

FIG. 16 is a flowchart depicting operations 450 for applying a split intra-frame pause (e.g., intra-frame pause segments) to the electronic display 18, according to an embodiment of the present disclosure. In some embodiments, the operations 450 may be performed by one or more processors, such as the processor core complex 12, of the electronic device 10, discussed with respect to FIG. 1.

As shown, the flowchart begins at operation 452 where a duration of an intra-frame pause to be applied to an image frame is determined. In some cases, a duration of more than one intra-frame pause may be determined. The duration of multiple intra-frame pauses may be the same or different.

At operation 454, the duration of the intra-frame pause determined at operation 452 may be divided into two or more segments. In some embodiments, a duration of each segment may be the same. That is, if the original intra-frame pause is divided into two segments, each segment may have a duration of one-half the duration of the original intra-frame pause. Similarly, if the original intra-frame pause is divided into three segments, each segment may have a duration of one-third the duration of the original intra-frame pause.

At operation 456, a location on the display 18 at which the intra-frame pause segments may be applied is determined. As discussed above, each segment of the intra-frame pause may be applied at a different location on the display 18. For example, as discussed with respect to FIG. 15A-15C, two locations may be determined for each image frame. The locations form a pattern which may be repeated for subsequent image frame and intra-frame pause segments.

At operation 458, the segments of the intra-frame pause may be applied at the locations determined at operation 456. When a particular intra-frame pause segment is applied to the display, the display may stop (e.g., pause) writing image data to the display and perform another function, such as detecting a touch input.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electronic display, comprising:
   display driver circuitry configured to display at least a first image frame and a second image frame on the electronic display using at least a first display pixel and a second display pixel;
   touch sensing circuitry configured to detect user interaction with the electronic display; and
   a controller configured to:
   determine a duration of an intra-frame pause to be applied to the electronic display;
   divide the duration of the intra-frame pause into a number of intra-frame pause segments, wherein a total duration of the number of intra-frame pause segments is equal to the duration of the intra-frame pause;
   determine a location on the electronic display for each of the intra-frame pause segments, wherein a first location is separated from a second location by a distance;
   insert a first intra-frame pause segment of the intra-frame pause at the first location during rendering of the first image frame; and
   insert a second intra-frame pause segment of the intra-frame pause at the second location during rendering of the first image frame.

2. The electronic display of claim 1, wherein the controller is configured to determine the first location based at least in part on the duration of the intra-frame pause.

3. The electronic display of claim 1, wherein the controller is configured to:
adjust an emission ratio for at least the first display pixel such that the emission ratio of the first display pixel is the same before and after the first intra-frame pause segment is inserted.

4. The electronic display of claim 1, wherein the controller is configured to determine a third location and a fourth location, the third location separated from the fourth location by the distance.

5. The electronic display of claim 4, wherein the controller is configured to:
insert a third intra-frame pause segment of the intra-frame pause at the third location during rendering of the second image frame; and
insert a fourth intra-frame pause segment of the intra-frame pause at the fourth location during rendering of the second image frame.

6. The electronic display of claim 5, wherein the controller is configured to:
insert the first intra-frame pause segment of the intra-frame pause at the first location during rendering of a third image frame; and
insert the second intra-frame pause segment of the intra-frame pause at the second location during rendering of the third image frame.

7. The electronic display of claim 6, wherein the controller is configured to:
insert the third intra-frame pause segment of the intra-frame pause at the third location during rendering of a fourth image frame; and
insert the fourth intra-frame pause segment of the intra-frame pause at the fourth location during rendering of the fourth image frame.

8. The electronic display of claim 7, wherein a starting point of the third intra-frame pause segment during the second image frame is applied during a time period of the first intra-frame pause segment applied during the first image frame.

9. The electronic display of claim 5, wherein the first image frame and the second image frame are separated by at least two image frames.

10. A tangible, non-transitory, computer readable medium storing instructions that when executed by one or more processors, cause the one or more processors to:
determine a duration of an intra-frame pause to be applied to an electronic display;
divide the duration of the intra-frame pause into a number of intra-frame pause segments, wherein a total duration of the number of intra-frame pause segments is the same as the duration of the intra-frame pause;
determine a location on the electronic display for each of the intra-frame pause segments, wherein a first location is separated from a second location by a number of rows of pixels of the electronic display;
insert a first intra-frame pause segment of the intra-frame pause at the first location during rendering of a first image frame; and
insert a second intra-frame pause segment of the intra-frame pause at a second location during rendering of the first image frame.

11. The computer readable medium of claim 10, comprising instructions that, when executed, cause the one or more processors to:
determine a third location for a third intra-frame pause segment of the number of intra-frame pause segments and a fourth location for a fourth intra-frame pause segment of the number of intra-frame pause segments, the third location separated from the fourth location by a distance;
insert the third intra-frame pause segment of the number of intra-frame pause segments at the third location during rendering of a second image frame; and
insert the fourth intra-frame pause segment of the number of intra-frame pause segments at the fourth location during rendering of the second image frame.

12. The computer readable medium of claim 11, wherein the distance between the third location and the second location is different that the number of rows of pixels between the first location and the second location.

13. The computer readable medium of claim 11, comprising instructions that, when executed, cause the one or more processors to:
adjust an emission ratio for at least a first display pixel of the electronic display such that the emission ratio of the first display pixel is the same before and after insertion of the first intra-frame pause segment.

14. The computer readable medium of claim 13, comprising instructions that, when executed, cause the one or more processors to:
adjust an emission ratio for a second display pixel of the electronic display such that the emission ratio of the second display pixel is the same before and after insertion of the second intra-frame pause segment; and
adjust an emission ratio for a third display pixel of the electronic display such that the emission ratio of the third display pixel is the same before and after insertion of the third intra-frame pause segment.

15. A method, comprising:
determining a duration of an intra-frame pause to be applied to an electronic display;
dividing the duration of the intra-frame pause into a number of intra-frame pause segments, wherein a total duration of the number of intra-frame pause segments is equal to the duration of the intra-frame pause;
determining a location on the electronic display for each of the intra-frame pause segments, wherein a first location is separated from a second location by a distance;
writing a first portion of a first image frame to a first section of display pixels of the electronic display to display the first portion of the first image frame;
pausing the writing of the first portion of the first image frame at the first location;
inserting a first intra-frame pause segment of the number of intra-frame pause segments at the first location to detect a first user input;
upon completion of a duration of the first intra-frame pause segment, writing a second portion of the first image frame to a second section of display pixels of the electronic display to display the second portion of the first image frame;
upon completion of writing the first image frame, writing a first portion of a second image frame to a third section of display pixels of the electronic display to display the first portion of the second image frame;
pausing the writing of the first portion of the second image frame at the second location;
inserting a second intra-frame pause segment of the number of intra-frame pause segments at the second location to detect a second user input; and
upon completion of a duration of the second intra-frame pause segment, writing a second portion of the second image frame to a fourth section of display pixels of the electronic display to display the second portion of the second image frame.

16. The method of claim 15, wherein a duration of the pause of writing the first image frame is equal to the duration of the first intra-frame pause segment.

17. The method of claim 15, wherein the duration of the first intra-frame pause segment is equal to the duration of the second intra-frame pause segment.

18. The method of claim 15, wherein the distance between the first location and the second location is based at least in part on the duration of the first intra-frame pause segment.

19. The method of claim 18, wherein the distance is at least two rows of pixels of the electronic display.

20. The method of claim 18, wherein the first image frame and the second image frame are separated by at least two image frames.

\* \* \* \* \*